US008707304B2

(12) United States Patent
Ashok et al.

(10) Patent No.: US 8,707,304 B2
(45) Date of Patent: *Apr. 22, 2014

(54) AUTOMATED TUNING IN A VIRTUAL MACHINE COMPUTING ENVIRONMENT

(75) Inventors: Rohith Kottamangalam Ashok, Apex, NC (US); David Blair Gilgen, Raleigh, NC (US); Ruth Edith Willenborg, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 211 days.

This patent is subject to a terminal disclaimer.

(21) Appl. No.: 13/414,163

(22) Filed: Mar. 7, 2012

(65) Prior Publication Data

US 2012/0174099 A1    Jul. 5, 2012

Related U.S. Application Data

(63) Continuation of application No. 12/769,186, filed on Apr. 28, 2010.

(51) Int. Cl.
G06F 9/455 (2006.01)

(52) U.S. Cl.
USPC .............................................................. 718/1

(58) Field of Classification Search
None
See application file for complete search history.

(56) References Cited

U.S. PATENT DOCUMENTS

| 5,367,637 | A | 11/1994 | Wei |
| 6,075,938 | A | 6/2000 | Bugnion et al. |
| 6,289,506 | B1 | 9/2001 | Kwong et al. |
| 7,120,621 | B2 | 10/2006 | Bigus et al. |
| 7,483,873 | B2 | 1/2009 | Bhattacharjee et al. |
| 7,657,508 | B2 | 2/2010 | Morris et al. |
| 2003/0023661 | A1* | 1/2003 | Clohessy et al. .............. 709/104 |
| 2004/0154016 | A1 | 8/2004 | Randall |
| 2005/0033846 | A1 | 2/2005 | Sankaranarayan et al. |
| 2005/0289540 | A1* | 12/2005 | Nguyen et al. .................... 718/1 |
| 2006/0004977 | A1 | 1/2006 | Jann et al. |
| 2009/0133013 | A1* | 5/2009 | Criddle et al. ................ 717/174 |

OTHER PUBLICATIONS

Huck-et al.; "Capturing Performance Knowledge for Automated Analysis"; ACM Digital Library/IEEE; Nov. 2008.
El-Ayat-et al.; "Algorithms for a Self-Tuning Microprogrammed Computer"; INSPEC/IEEE; pp. 85-91; 1977.
"IBMTivoliIdentity Manager version 4.5.1 Performance Tuning Guide" Nov. 30, 2007.
Monson, et al. "IBM Webshpere Application Server v6.1 on the Solaris 10 Operating System" ibm.com/redbooks, Mar. 2008.
"IBM Webshpere Application Server Network Deployment, Version 6," Nov. 30, 2004.
Kumar, "How to Get Started with IBM WebSphere Application Server on Solaris 10 and Zones," Sun Microsystems, May 24, 2006.

* cited by examiner

Primary Examiner — Emerson Puente
Assistant Examiner — Sisley Kim
(74) Attorney, Agent, or Firm — Grasso PLLC; Fred Grasso

(57) ABSTRACT

Automatic optimization of application performance parameters is provided. This optimization may be provided by identifying the resource demands of applications using virtual resources, identifying the virtual resources that can be available to the applications, and allocating the virtual resources to the applications to be run on a virtual machine.

9 Claims, 3 Drawing Sheets

AUTOMATED TUNING IN A VIRTUAL MACHINE COMPUTING ENVIRONMENT

BACKGROUND

The present invention relates to virtual machines in a computing environment and more specifically to tuning or adjusting resources, applications, and other logic present on one or more virtual applications or virtual machines in a computing environment or system.

Computing systems may be partitioned internally through the use of virtual machines or virtual containers. These machines or containers may be created to allow separate operating systems to run on a single hardware system, to provide for fail-over safety, for translating between otherwise non-compatible programs and/or operating systems, and for other reasons as well. The virtual machines or containers may be created such that they appear to be physical machines to the programs running on them. As a program needs resources to function, the virtual machine may provide them in support of the program. For example, when processing power or network communications are needed by an application, the virtual machine may facilitate the necessary processing power and the needed network communications between the application and the underlying physical system. This translation step is unperceivable to the application as the resources are provided.

Virtual machines are often considered to be isolated duplicates of physical machines and may be set up to have little or no direct correspondence to specific hardware. In other words, the virtual machine may have selected limits and thresholds that fall below the capabilities of the underlying physical system hardware on which the virtual machines are created and operating.

Virtual machines are often separated into two categories: system virtual machines and process virtual machines. A system virtual machine may provide a complete system platform on which multiple operating systems can co-exist in isolation from each other. In some instances the system virtual machines can provide instruction set architecture that may be tailored with differences from the underlying actual hardware. Comparatively, a process virtual machine, which may also be referred to as an application virtual machine, may run an application within a system virtual machine. The process virtual machine may support a single process and may be created when it is initiated and may be destroyed when the process ends.

Process virtual machines may be compiled at run time and may be carried out using an interpreter that serves to bridge between the virtual machine and the underlying physical hardware. Examples of virtual machines compiled at run time include Java virtual machines, Parrot virtual machines, and .NET Framework.

From teachings of this disclosure, one of skill in the art will appreciate that allocating resources for a single application at start-up is problematic because there are often other applications installed on the same machine. These other applications may deliberately and to their detriment contend for the same resources. Thus, without considering or weighing demands beyond a single application on start-up, the application may not be correctly optimized and may not correctly select and sequester the proper amount of resources needed from the available resources for improved or best available performance. Still further, the applications may not consider that certain resources are only needed during certain times by certain applications. Consequently, more resources may be allocated than needed, and the proper amount of resources may not be allocated as well. Furthermore, there may be other problems that work against the optimum use of virtual resources for the application as well.

BRIEF SUMMARY

Embodiments of the invention may serve to automatically optimize application performance parameters based on or using virtual resources allocated for the application. In embodiments, application settings may be automatically selected or tuned based on the resources available from the virtual machine or container in which the application is set to run.

In embodiments, to accomplish auto-tuning, the application may be shipped or downloaded for use as a virtual image, complete with its own operating environment. Then, upon instantiation, the application may be tuned for the specific amount of virtual resources needed to optimally function. When multiple applications are set to run, the virtual resource requirements of some or all of the applications may be considered as the applications are tuned and resources from the virtual environment are allocated. These allocations may be permanent allocations, shared allocations, individual allocations, temporal allocations, and other categories of allocations as well.

In embodiments, the automation of the tuning of the applications may reduce or eliminate the need for manual intervention, for setting runtime allocations, during the loading process. In other words, administrators of the virtual applications and the virtual machines may not need to investigate or consider the allocation of virtual resources when multiple applications will be running in a virtual environment. Likewise, administrators may not need to define allocations of resources according to temporal parameters, parameters associated with the individual applications, or parameters associated with the virtual environment. Thus, in embodiments, as applications are instantiated as a virtual machine, the parameters of each application, along with the parameters of the virtual environment, may be considered and allocations of the virtual environment may be made consistent with these considerations.

DETAILED DESCRIPTION

Embodiments of the invention may be directed to the installation and tuning of applications in a virtual machine environment. For example, embodiments of the invention may be directed to the installation of an application on a server and the tuning of an operating system and the application according to the physical resources available for the application.

In embodiments, a virtual machine management agent may identify and consider each of the applications running on the virtual machine of the server and the resources that the applications are contending for. The virtual machine management agent may act to uniquely tune each application installation. The virtual machine management agent may also act to identify the resources available to a virtual machine running on a server, install the operating system and the application software, and tune the operating system and application software according to the resources of the virtual machine. This identification, installation, and tuning may be done in conjunction with or in lieu of a manual installation and tuning process. In embodiments, the operating system may be previously installed ahead of the virtual machine management agent serving to tune the application software slated to run on the virtual machine.

In embodiments, metadata may be read and considered to identify the parameters needed by applications to be run on a virtual machine. Then, as the virtual machine is instantiated, the resources of the virtual machine may be automatically allocated to the applications based on the previously considered parameters. In embodiments, the virtual machine management agent may be present in the virtual machine and may be run or activated when one or more applications are instantiated on the virtual machine.

Figure 1:
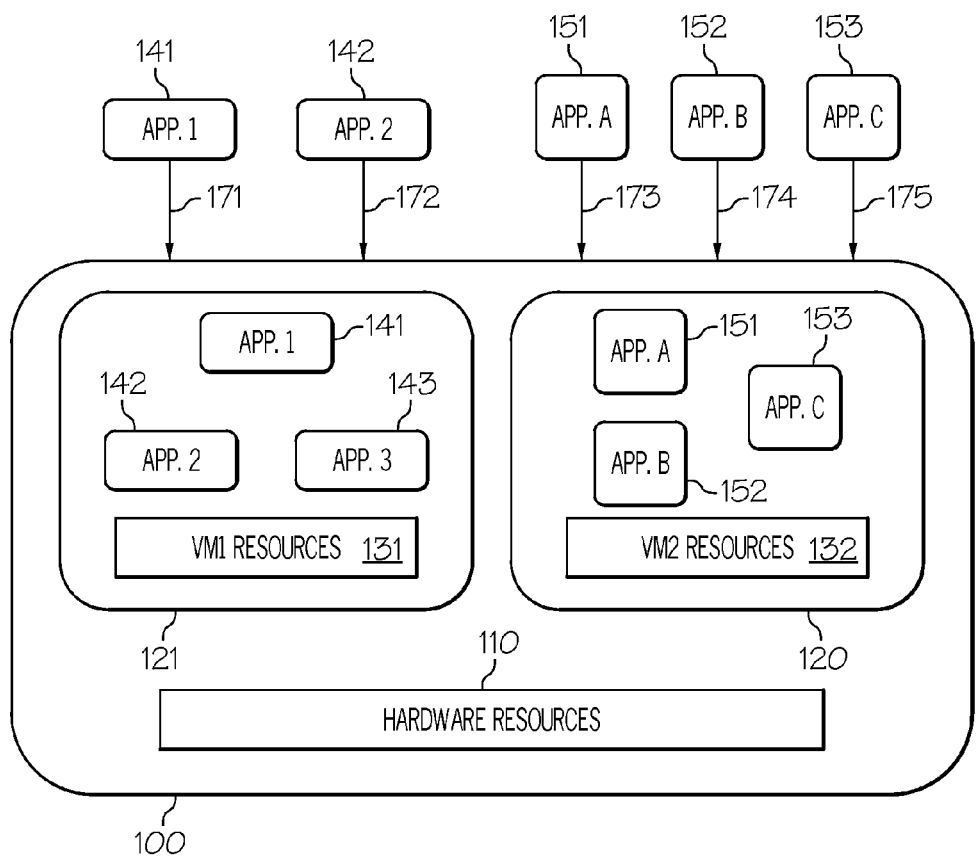
FIG. 1 shows a schematic of a server having two virtual machines running thereon, in accord with embodiments of the invention.

FIG. 1 includes a schematic of a physical server 100 configured in accord with embodiments of the invention. As can be seen in FIG. 1, a physical server embodying the invention may contain its own resources 110 and may be running multiple virtual machines, with each virtual machine running multiple applications within it. FIG. 1 shows that virtual image applications 141 and 142 may be loaded into a virtual machine 121 to be run thereon. These application may be loaded one at a time, and simultaneously, and may be loaded with other virtual applications as well. Virtual application 3, 143, shows that some applications may be resident on the virtual machine 121 when other applications are loaded.

The virtual machines 120 and 121 may each contain an operating system as well as their own resources 131 and 132. The operating systems may be the same or different and may be isolated from each other for increased security, redundancy and for other reasons as well. As with virtual machine 121, virtual machine 120 may contain resources and may be running multiple applications. The applications running on virtual machines 120 and 121 may be received as virtual images prior to loading onto the virtual machines. For example, applications 141, 142, and 151 are shown as virtual images in FIG. 1. The applications running on the virtual machines 120 and 121 may also be received in other states as well. For example, applications 152 and 153 are not shown as being received as a virtual image, but are, instead received in a different format. When a received application is not in a virtual image state, the virtual machine management agent may query or investigate the application to determine the resources needed to run the application on the virtual machine. This query may include considering metadata of the application as well as considering other portions of the application as well. Still further, the virtual machine and the application may also be previously loaded and then further considered as the virtual machine is instantiated prior to being deployed.

Arrows 171-175 show that the applications may be compiled or unpacked prior to being loaded onto a virtual machine. Once the applications are loaded onto the virtual machines, the applications may operate within the specific operating systems of the virtual machines and use the applicable virtual machine resources, e.g. 131 and 132.

In accord with embodiments, when the virtual machine 120 or 121 is initiated and applications are being initiated a virtual machine management agent may query metadata of each application in order to delineate the resources needed by each application to run properly in a virtual environment. After querying each application to identify resources that are preferred or required, the virtual machine management agent may then configure each application and allocate resources from the virtual machine resources 131 and 132 for each application. This allocation may include allocating resources for specific independent uses as well as for shared uses by applications. For example, different memory blocks may be allocated for each application for the entire duration of time that the application runs. Comparatively, processing power may be shared by applications at the same time or used exclusively by one application in a preset order. Still further, a priority may be set such that when one application needs resources those resources may be allocated to the application with a highest priority. In so doing, in embodiments, applications running on the virtual machine 121 may each be tuned and optimized such that their performance is tuned based on the resources allocated to it as well as in consideration of how those resources are being shared by other applications running on the virtual machine 121.

As noted, in FIG. 1 the applications may be presented to the virtual machines as part of the virtual images, as shown at 141, 142, and 151. The applications may also be presented to the virtual machines without using the virtual image, which is shown at 152 and 153. When not presented as a virtual image, logic from a virtual machine management agent may query the application to identify its resource needs. Still further, not all applications may be loaded onto the virtual machine at the same time.

In embodiments, when the applications are be compiled or loaded for start-up, it is preferred that all applications are considered and reviewed at approximately the same time. In so doing resources may be evaluated at runtime and start-up. Virtual memory, virtual CPU allocations, Java heap size, and thread settings, are all resources or allocations that may be set in embodiments. Other examples also include database buffers, network connections, memory size, and processor priority. In addition to these, still more resources and parameters may be set.

Figure 2:
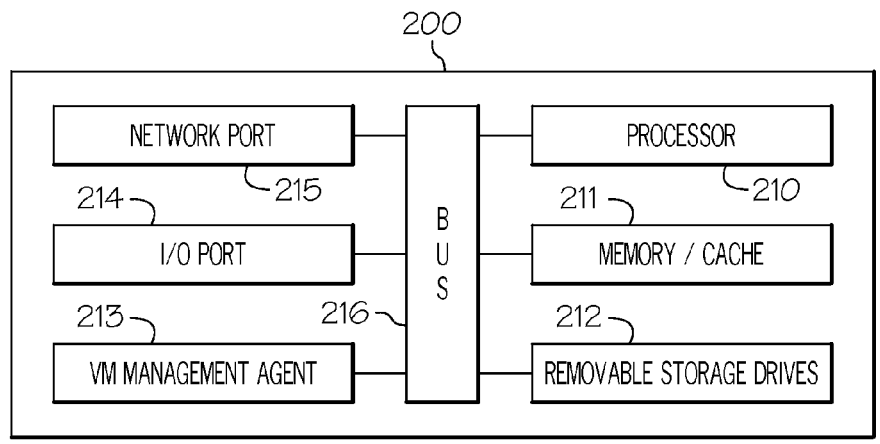
FIG. 2 shows a schematic of a server having a virtual machine management agent, in accord with embodiments of the invention.

FIG. 2 shows a physical server 200 having a network port 215, an I/O port 214, a virtual machine management agent 213, a bus 216, processor 210, memory cache 211, and a removable storage drive 212. Each of the components in the physical server 200 may be connected to each other through the bus 216 as well as through other connection methods. The memory cache 211 may store instructions to be run by the processor 210, wherein these instructions carry out embodiments of the invention. These instructions may be carried out in various orders and with and without instructions different from those present herein, in embodiments of the invention.

The virtual management agent 213 is shown in FIG. 2 as an independent component of the physical server 200, however, the virtual management agent 213 may actually be stored within memory 211 in embodiments. Thus, logic configured to serve as the virtual machine management agent may be position on an independent component as well as with logic performing other functions or duties. The physical server 200 in FIG. 2 may be located in a network, on a stand-alone processing unit, and have other configurations as well.

Consistent with the physical server 100 in FIG. 1, the physical server 200 of FIG. 2 may be running one or more virtual machines. As applications are loaded onto the virtual machines, the virtual machine management agent 213 may act in conjunction with the processor 210, and the memory cache 211, in order to carry out embodiments of the invention. These actions may include querying identifying virtual resources allocated for any virtual machine running on the physical server, determining the resources needed for any virtual application to run on these virtual machines, and allocating the virtual machine resources to the virtual applications in order to tune and optimize the functioning of the virtual applications. Examples of the applications to be run on the physical server as a virtual machine include Apache HTTP Server, IBM HTTP Server, Microsoft Internet Information Services.

Figure 3:
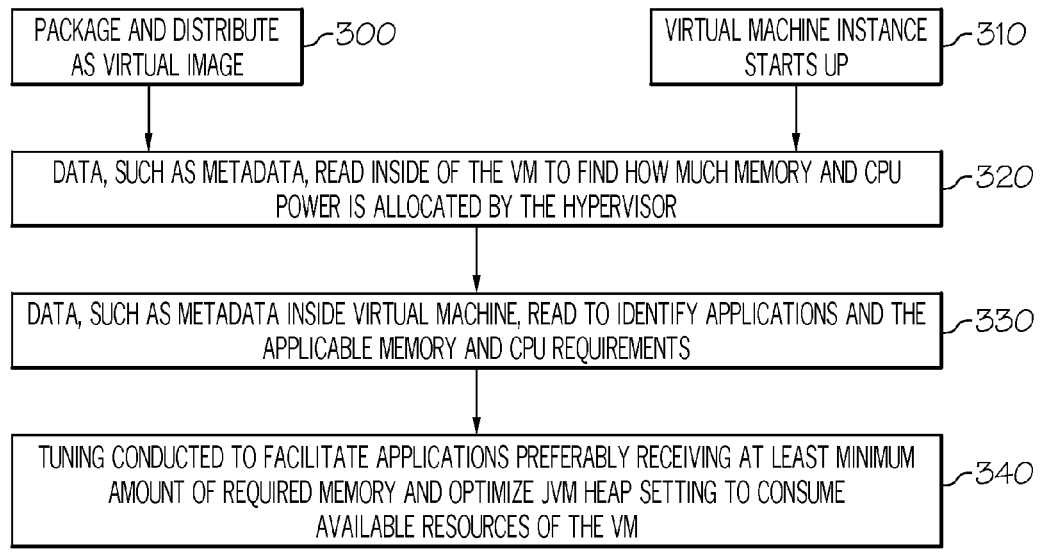
FIG. 3 shows a method employing virtual machines and the allocation of resources in accord with embodiments of the invention.

FIG. 3 shows a method in accord with embodiments of the invention. Various actions and events may be included in the embodiment. These may include packaging and distributing an application as a virtual image, as shown at 300 and starting up the instance of a virtual machine, as shown at 310. The virtual machine instance may start up on a physical server and may be facilitated by a hypervisor. At 320, data such as native data may be read inside the virtual machine to find out how much vMemory, vCPU power, and other resources are allocated by the hypervisor for the virtual machine. For example, a virtual machine management agent may query metadata to confirm how much memory, CPU power, and other resources are allocated to that virtual machine by a hypervisor.

At 330, data, such as metadata inside the virtual machine, may be read to identify the vMemory and vCPU requirements for that particular application. This may be conducted by a virtual machine management agent—the same one that identifies the virtual machine resources, as well as a separate one slated to query and manage applications themselves. In embodiments, after the metadata for the application and the virtual machine itself have been considered to identify the resources available and the resources required, tuning may be conducted to facilitate the optimal operation of applications running on the virtual machine. This action is shown at 340. Also, when Java applications are being used, considering and optimizing the JVM heap may be actions taken by the virtual machine management agent.

Figure 4:
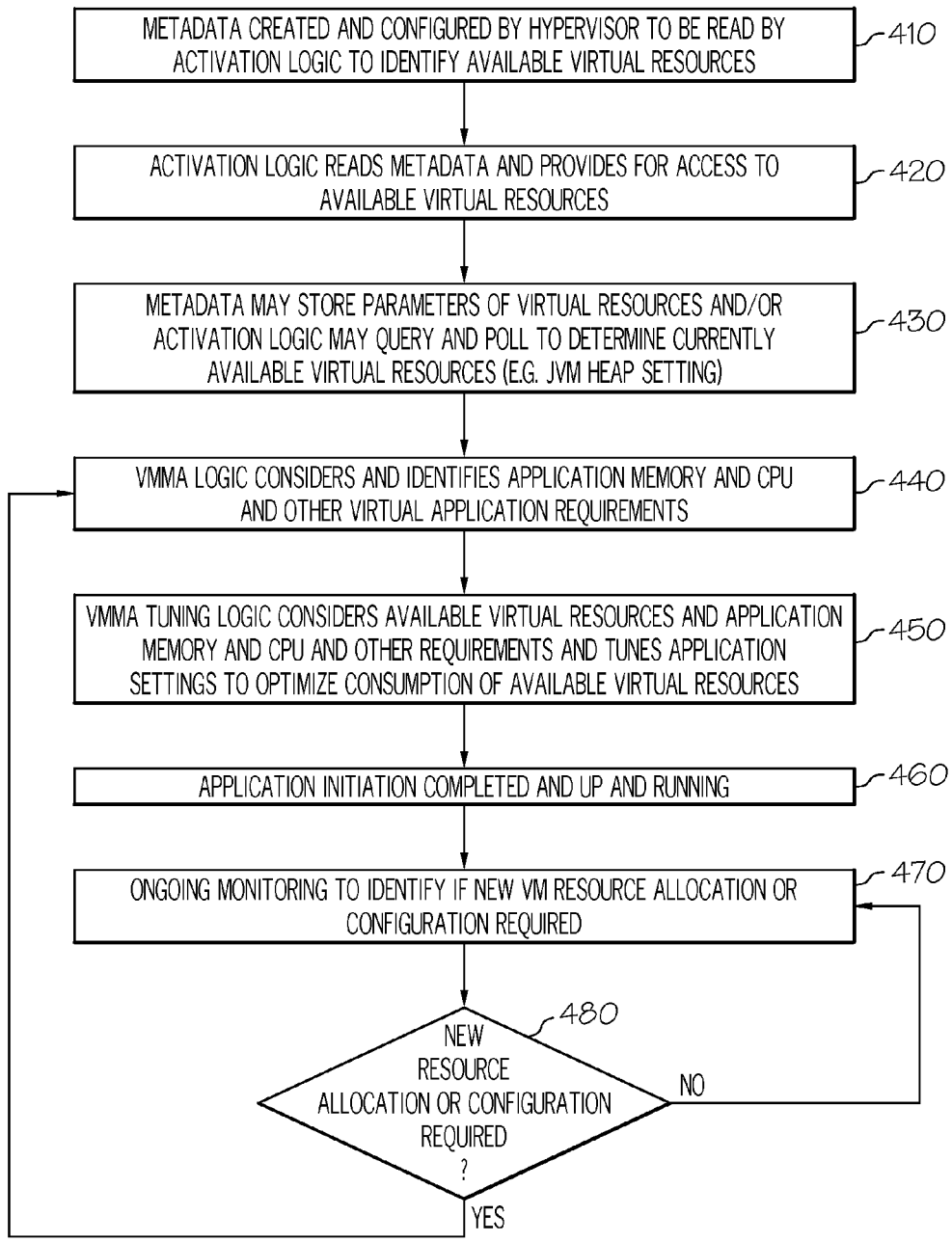
FIG. 4 shows a method employing virtual machines and the allocation of resources in accord with embodiments of the invention.

FIG. 4 shows a method in accord with embodiments of the invention. As with the method described in FIG. 3, the method of FIG. 4 may be conducted in the proposed order, in other orders, with the actions as provided, as well as with different actions, including both more and fewer actions.

At 410, metadata created and configured may be read by activation logic to identify available virtual resources. At 420, activation logic may also read metadata and provide for access to available virtual resources. Then, at 430, metadata may store the parameters of the virtual resources and the activation logic may query and poll the metadata to determine available virtual resources. As noted above, these virtual resources may include Java virtual machine heap settings.

At 440, virtual machine management agent logic may consider and identify application vMemory and vCPU requirements as well as other virtual application requirements. Then, at 450, a virtual machine management agent may consider available virtual resources and application requirements and then go ahead and tune the application settings to optimize the consumption of available virtual resources. At 460, identified setting may be in place and the application may be running on the virtual machine. As the application runs, periodic monitoring may take place. This monitoring may be conducted to if any new resource allocations need to be done and/or the current resource allocations are properly allocated. If new resource allocations are required, as indicated at 480, the virtual machine management agents may consider deploying or allocating those additional resources to the virtual application, as shown by the arrow between 480 and 440. If no new resource allocation or certifications are required, the monitoring may continue, as shown by the arrow leading from 480 to 470.

Advantages of embodiments of the invention may include the automation of the tuning of virtual applications within a virtual machine and may alleviate a need for specific knowledge of virtual hardware during a manual application installation. Experiments using embodiments of the invention, directed to adjusting the JVM heap setting and thread settings showed performance improvements of up to 25% over application installations that did not apply embodiments of the invention. Embodiments of the invention may not reach or need to reach this level of improvement. Likewise, embodiments of the invention may not demonstrate measurable levels of improvement in some settings and environments.

In an exemplary embodiment, an application may be packaged and distributed as a virtual image, complete with operating system and application capabilities. For example, WebSphere Application Server Hypervisor Edition, which includes WebSphere Application Server and SLES 10.2 Linux operating system may be used in embodiments of the invention. After the virtual machine is started, activation logic may query the virtual image code to obtain to virtual resources that are available to it (memory, CPU, disk). Logic may also be included in the virtual image code to access information regarding the specific functions that the virtual machine will need to perform and the processes that will be running and their resource requirements. For example, the WebSphere Application Server Hypervisor Edition image may be adjusted to perform the function of a WebSphere Deployment Manager, or IBM HTTP Server, or custom node, etc. depending on the parameters provided. In each instance, functions performed and the resources needed to perform them may require very different tuning for optimal performance. Thus, in embodiments, the functions to be performed by the virtual application may also need to be considered by the virtual machine management agent when allocating resources as the same virtual application may require different resources depending upon the functionality that will be performed by the virtual application for that start-up.

In embodiments, custom nodes may be configured to run on multiple application servers, where each which will need JVM heap resources. Thus, in these or other embodiments, the application settings may be automatically and specifically tuned according to the virtual resources available and the function that the virtual machine will perform within the solution. As described above, the tuning is for a virtual machine and may be done at start up. This tuning may be done with a full understanding of the operating system and the application that will be consuming the resources. As an example, a WebSphere Application Server custom node JVM heap setting may be made to consume the highest percentage of the available memory, while leaving the amount of room WebSphere knows is required for non-Java use.

In embodiments, the virtual machine management agent may understand the perspective of the application needs and resources, so if multiple JVMs are going to be used these multiple JVMs may also be accounted for. In a specific example, total virtual memory may be set at 768M/the number of JVMs present.

In embodiments, as mentioned above, the virtual application may be packaged as a virtual image. This may be done in order to control the entire stack that the program may be running on. These stack properties may be known at start up, thus, the application can actually be tuned in the virtual machine with knowledge as to what is available to it at start up.

For Java applications in particular, the Java heap may be automatically sized because the virtual image packaging provides up-front knowledge; likewise, tuning of threads in a ratio relevant to CPU processes may also be set.

Hypervisor is used herein in its ordinary and customary meaning to include logic that facilitates virtual operating systems with a virtual platform and monitors the execution of the virtual operating system when running. Thus, the hypervisor serves to define virtual machine resources on a physical system, such as a server.

Java heap is used herein in its ordinary and customary meaning to include virtual machine memory running inside of server virtual machine. More specifically to memory allocated to the Java Virtual Machine, which is usually used for dynamic memory allocation.

Thread setting is used herein in its ordinary and customary meaning to include connections off of concurrently running programs to resources used or needed by the programs. How threads are implemented may vary from one operating system to another. The resources that the threads can link to include memory, network ports, CPU processing, and database buffers. Other resources may be threaded to as well.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

What is claimed is:

1. A method comprising:
    at a processor, identifying available resources of a first virtual machine, the first virtual machine containing a first operating system, the virtual resources comprising at least virtual memory and virtual CPU allocation;
    at a processor, identifying resource requirements from one or more applications to be run on the first virtual machine;
    at a processor, identifying resource requirements of one or more of the applications using a virtual image of the one or more applications;
    at a processor, identifying resource requirements by querying metadata from the one or more applications, wherein the metadata stores parameters of the virtual resources including java virtual machine heap settings;
    at a processor, determining the allocation of the available resources of the first virtual machine after identifying the resource requirements from the one or more applications; and
    setting resource allocations for the first virtual machine for the one or more applications consistent with the determined allocation of available virtual machine resources available to the first virtual machine.

2. The method of claim 1 wherein, when determining the allocation of the available resources of the virtual machine includes
    identify available virtual resources of a second virtual machine, the second virtual machine containing a second operating system;
    identify resource requirements from a plurality of applications to be run on the second operating system contained in the second virtual machine;
    determine the allocation of the available virtual resources of the second virtual machine after identifying the resource requirements from the plurality of applications; and
    set resource allocations for the second virtual machine for one or more applications consistent with the determined allocation of available virtual resources available to the second virtual machine.

3. The method of claim 1 wherein, when determining the allocation of the available resources of the virtual machine includes determining quality of service parameters of the one or more applications.

4. The method of claim 1 wherein parameters of the one or more applications are set after determining operating characteristics of the one or more applications and after determining quality of service parameters of the one or more applications.

5. The method of claim 4 wherein the parameters are set to optimize consumption of available resources of the virtual machine.

6. The method of claim 4 wherein one or more of the one or more applications is a middleware application, and wherein one or more of the parameters set for a virtual application is virtual memory.

7. The method of claim 6 wherein the middleware is a Java application and wherein the parameter is a JVM heap.

8. The method of claim 1 further comprising:
    monitoring resource allocations of the virtual machine, wherein, setting resource allocations includes setting the available resources of the virtual machine.

9. The method of claim 1 wherein a virtual machine management agent is tuned to set resource allocations for the one or more applications consistent with the determined allocation of available virtual machine resources.

* * * * *